Oct. 1, 1935.  C. A. CAMPBELL  2,015,785
AIR BRAKE
Filed Sept. 20, 1934
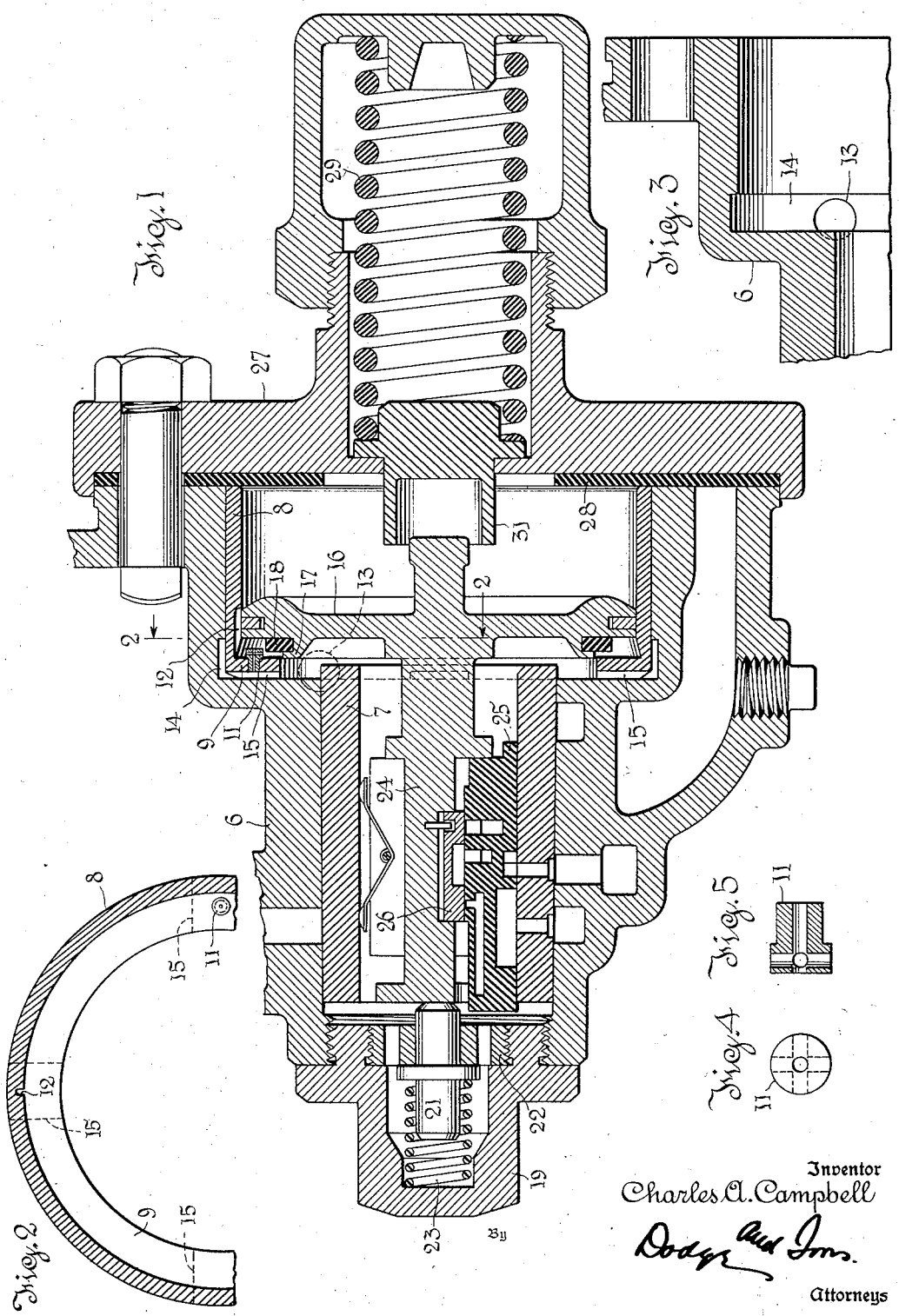
Inventor
Charles A. Campbell
By Dodge and Sons
Attorneys Patented Oct. 1, 1935

2,015,785

UNITED STATES PATENT OFFICE 2,015,785

AIR BRAKE

Charles A. Campbell, Watertown, N. Y., assignor to The New York Air Brake Company, a corporation of New Jersey Application September 20, 1934, Serial No. 744,820

4 Claims. (Cl. 303—64)

This invention relates to fluid pressure brakes and particularly to the charging functions of piston actuated valves such as triple valves, the equalizing portion of distributing valves and the like.

The main purpose of the invention is to secure positive control of the charging rate and preclude any disturbing effects on restricted recharge such as those incident to ring leakage.

Another purpose of the invention is to preclude any derangement of the charging rate by refinishing operations such as are commonly performed on piston bushings.

The invention will now be described as applied to the equalizing portion of a distributing valve, it being understood that the pressure chamber used with such valve, is the analogue of the auxiliary reservoir used with triple valves, at least so far as charging functions are concerned.

The drawing shows a standard type of equalizing portion converted according to the invention to a form in which restricted recharge of the pressure chamber is secured.

In the drawing,—

Fig. 1 is an axial section through the equalizing portion of a distributing valve.

Fig. 2 is a fragmentary section on the line 2—2 of Fig. 1.

Fig. 3 is a fragmentary section of the body with the bushing omitted, and showing the pressure chamber port.

Fig. 4 is an end elevation.

Fig. 5 is an axial section of the choke used to control the restricted charging rate.

In Fig. 1 the drilled charge limiting choke is shown as if it (like the charging groove) lay on the plane of section, while Fig. 2 shows the preferred location of this choke.

The body is indicated at 6 and has a valve chamber bushing 7 and a piston chamber bushing 8. The bushing 8 departs markedly from prior practice in that it has an inturned flange 9 at its inner end, the flange 9 having a drilled port in which is mounted the choke 11 which performs the flow-restricting function. The bushing 8 has a charging groove 12 of ordinary form, and choke 11 and groove 12 are displaced 90° from each other on bushing 8, as clearly shown in Fig. 2. The choke 11, as clearly shown in Figs. 4 and 5, is flanged and has an axial passage intersecting cross passages through the flange.

Since the pressure chamber (not shown, but of usual form) communicates with the interior of body 6 through a drilled port 13 located as shown, a relief groove 14 is cut in body 6 to connect with port 13, and flange 9 is radially slotted as indicated at 15 to connect groove 14 and port 13 with the space within bushing 7. The flange of choke 11 lies in one of these radial slots.

The piston 16 conforms to past practice except that it has a flange 17 on its inner face behind which a gasket 18 is snapped. The gasket 18 is adapted to seal on the inner margin of flange 9, without blanking choke 11, when piston 16 is forced in to restricted recharge position against the resistance of the retard stop.

The retard stop is mounted in a threaded plug 19 screwed into body 6 at the inner end of the slide valve chamber. It comprises a flanged plunger 21 guided in a ported bushing 22 and urged outward by a coil compression spring 23. The flange on the plunger limits the outward motion of the latter and serves also as a seat for spring 23. The bushing 22 is threaded onto plug 19 as shown.

The retard stop plunger 21 engages the end of the piston stem 24 to establish a normal recharge position, indicated on Fig. 1. When brake pipe pressure rises rapidly spring 23 is overpowered and piston 16 moves in until gasket 18 seals on flange 9. This is restricted recharge position.

In normal recharge position, groove 12 fixes the charging rate. In restricted recharge position the flow is through groove 12 and choke 11 in series. At such times choke 11 establishes a definite low charging rate such as will prevent overcharging the pressure chamber under any normal manipulation of the engineer's brake valve.

The slide valve 25 and graduating valve 26 are actuated by the piston in the usual manner and perform the usual functions of these parts in the distributing valve chosen for illustration. The port dimensions are modified to accord with the extra travel to restricted recharge position, since the distributing valve as heretofore constructed had no charge restricting function. Otherwise, the porting is conventional.

The front cap 27 with its gasket 28, spring 29, and stop 31, conforms to past standards.

The invention is applicable in a similar manner to triple valves. In such valves the auxiliary reservoir communicates directly with the slide valve chamber so the relief groove 14 is not needed.

The invention secures positive limitation of the restricted charging rate, since gasket 18 seals and ensures that all flow is regulated by port 11. The location of choke 11 is such that refinishing operations on bushing 8 will not affect its size or capacity. Furthermore, the choke is replaceable.

What is claimed is,—

1. In an automatic brake valve, the combination of a body enclosing a valve chamber adapted to be connected with a storage volume, and a piston chamber adapted to be connected with a brake pipe; valve means in the first-named chamber; a cylinder bushing mounted in the second-named chamber, said bushing having a charging groove, and having at its inner end an inwardly directed flange provided with a flow restricting charging port of smaller capacity than the charging groove; a piston working in said bushing, controlling said charging groove and operatively connected with said valve means; a yielding gasket carried by said piston and adapted to seal against said flange, the outer margin of said gasket being at a shorter radial distance from the center of said piston than is said port in the bushing flange; and yielding means resisting motion of said piston to the point at which the gasket enters into sealing relation with said flange.

2. In an automatic brake valve, the combination of a body enclosing a valve chamber adapted to be connected with a storage volume, and a piston chamber adapted to be connected with a brake pipe; valve means in the first-named chamber; a cylinder bushing mounted in the second-named chamber, said bushing having a charging groove and having at its inner end an inwardly directed flange, said flange being spaced from said body to form a passage offering communication between the storage volume and the valve chamber, and said flange being provided with a flow-restricting charging port of smaller capacity than the charging groove; a piston working in said bushing and having means for forming a seal with said flange while maintaining said charging port open, said piston controlling said charging groove and being operatively connected with said valve means; and yielding means resisting motion of said piston into sealing relation with said flange.

3. In an automatic brake valve, the combination of a body enclosing a valve chamber adapted to be connected with a storage volume, and a piston chamber adapted to be connected with a brake pipe; valve means in the first-named chamber; a cylinder bushing mounted in the second-named chamber, said bushing having a charging groove, and having at its inner end an inwardly directed flange; a choke inserted through the flange in the bushing, said choke having a flow capacity smaller than the capacity of the charging groove; a piston working in said bushing and having means for forming a seal with said flange while maintaining said choke open, said piston controlling said charging groove and being operatively connected with said valve means; and yielding means resisting motion of said piston into sealing relation with said flange.

4. In an automatic brake valve, the combination of a body enclosing a valve chamber adapted to be connected with a storage volume and a piston chamber adapted to be connected with a brake pipe; valve means in the first-named chamber; a cylinder bushing mounted in the second-named chamber, said bushing having a charging groove, and having at its inner end an inwardly directed flange; a flanged insert mounted in the flange of said bushing and provided with a choke passage of smaller capacity than the charging groove and comprising an axial passage in said insert communicating with cross passages in the flange thereof; a piston working in said bushing and having means for forming a seal with said flange while maintaining said choke passage open, said piston controlling said charging groove and being operatively connected with said valve means; and yielding means resisting motion of said piston into sealing relation with said flange.

CHARLES A. CAMPBELL.